(No Model.) 3 Sheets—Sheet 1.

T. B. DOOLEY.
MACHINE FOR MOLDING CARBON POINTS.

No. 452,599. Patented May 19, 1891.

Witnesses
A. D. Hanson
Ewing W. Hamlen

Inventor
Thos. B. Dooley
by
Wright, Brown & Crosley
Attys.

(No Model.)

T. B. DOOLEY.
MACHINE FOR MOLDING CARBON POINTS.

No. 452,599. Patented May 19, 1891.

Witnesses
A. D. Hansen
Ewing W. Hamlen

Inventor
Thos. B. Dooley
by
Wise, Brown & Crossley
Attys

UNITED STATES PATENT OFFICE.

THOMAS B. DOOLEY, OF MALDEN, MASSACHUSETTS.

MACHINE FOR MOLDING CARBON POINTS.

SPECIFICATION forming part of Letters Patent No. 452,599, dated May 19, 1891.

Application filed September 15, 1890. Serial No. 364,985. (No model.)

*To all whom it may concern:*

Be it known that I, THOMAS B. DOOLEY, of Malden, in the county of Middlesex and State of Massachusetts, have invented certain new and useful Improvements in Machines for Molding Carbon Points, &c., of which the following is a specification.

My invention relates to means for making carbon electrodes or carbon points or pencils for electrical or other purposes.

The invention has for its object the provision of a machine whereby the points or pencils may be expeditiously and economically molded from powdered carbon agglomerated with dextrine or other similar matter to form a thick paste or plastic mass and to perform the work in a highly efficient manner.

The invention consists of the machine and parts and combination of parts in a machine for molding of carbon points or pencils, as is hereinafter fully described, and pointed out in the claims appended to this specification.

Reference is to be had to the annexed drawings and to the letters of reference marked thereon, forming a part of this specification, the same letters designating the same parts or features, as the case may be, wherever they occur.

Figure 1:
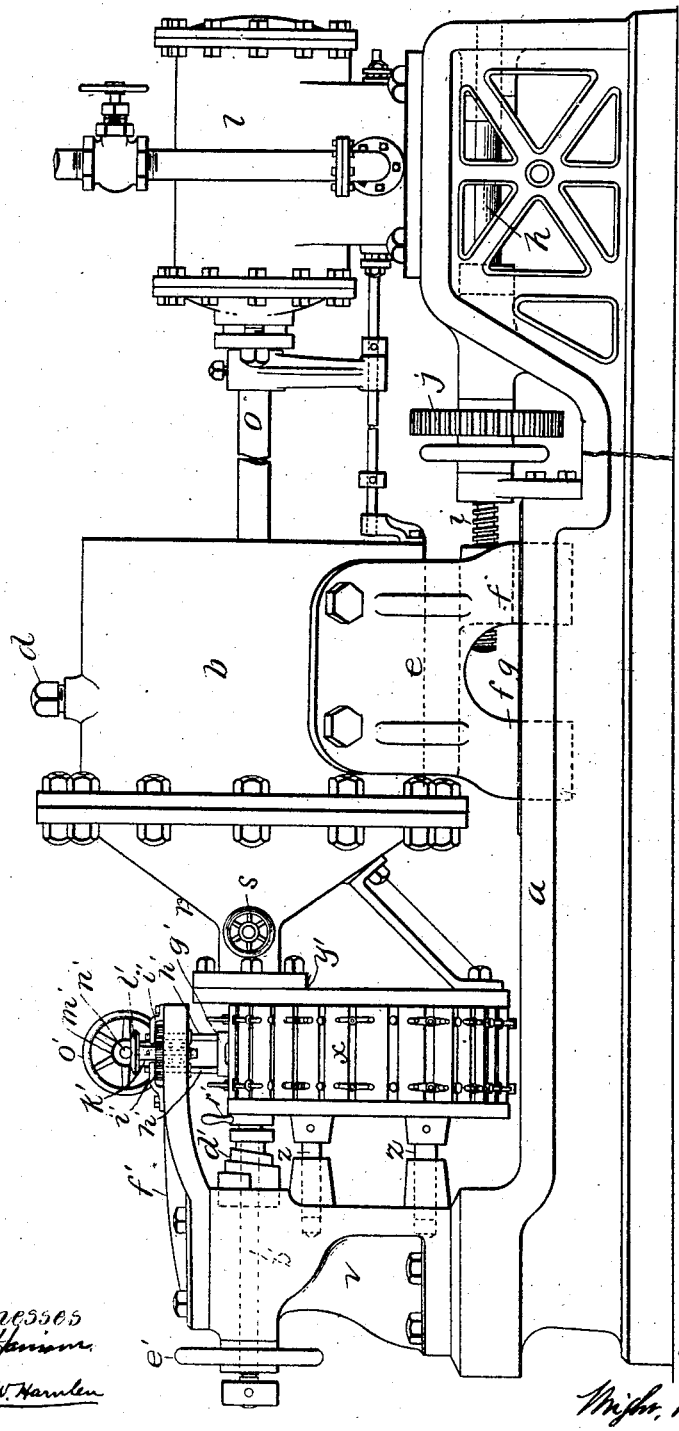
Figure 2:
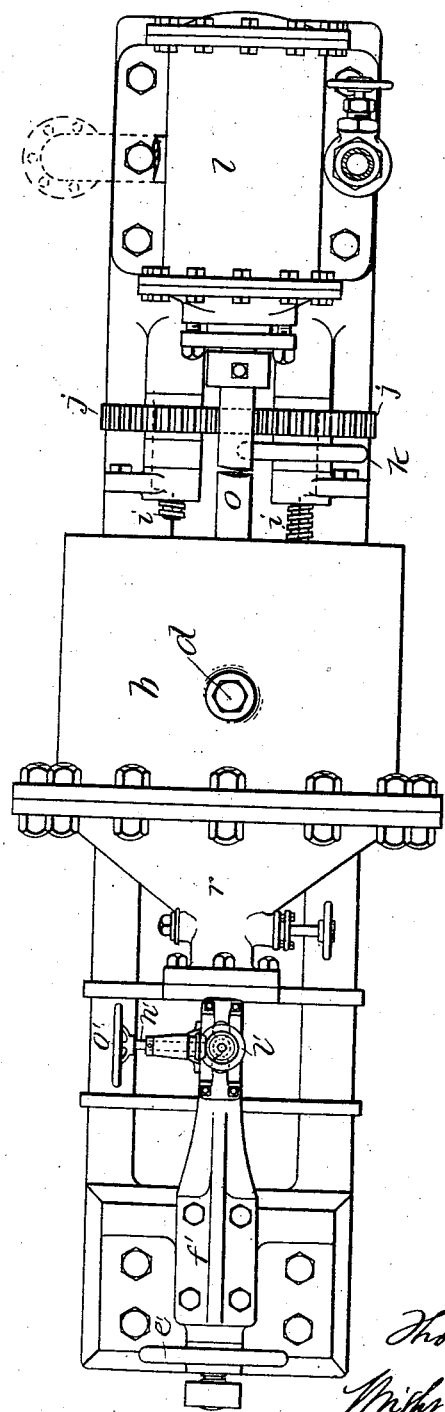
Figure 3:
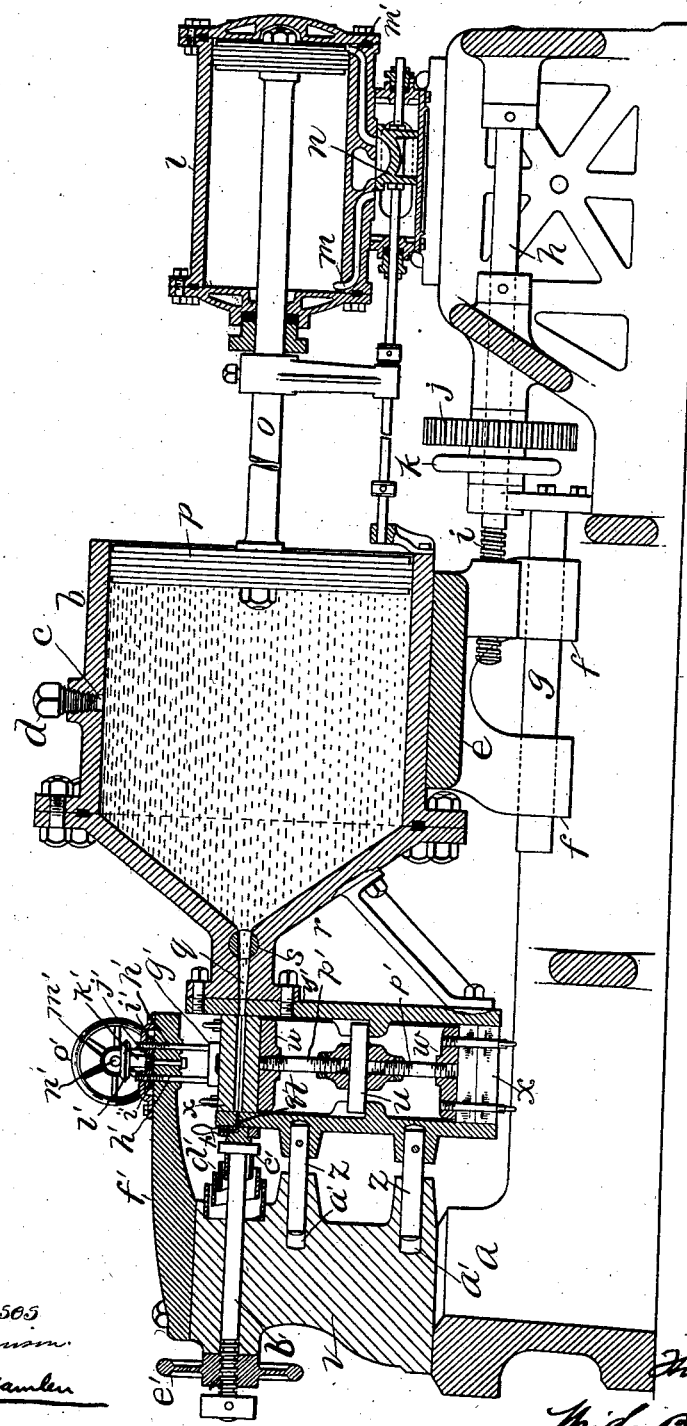

In the said drawings, Figure 1 is a side elevation of my improved machine complete, parts being represented as broken out. Fig. 2 is a top plan view of the same. Fig. 3 is a longitudinal sectional view of the same.

In the drawings, $a$ designates the frame of the machine, which may be made of iron or of any other suitable material capable of supporting the parts comprising the invention.

$b$ designates a cylindrical tank adapted to receive the plastic carbon to be molded into points or other articles or things through the port or opening $c$, which may be closed by means of a screw-plug $d$. The tank $b$ is connected with a base or bed $e$, provided with lugs $f$, which rest upon rods $g$, so that the bed and tank may be adjusted longitudinally of the machine upon the said rods $g$ for a purpose to be presently explained.

As a convenient means for adjusting the bed and tank as just described, I have represented two rods $h$, supported in suitable bearings in the bed, so as to be turned therein, but not so that they may be moved longitudinally, the forward ends of the rods being screw-threaded, as represented at $i$, where they are tapped through the rearward lugs $f$ of the bed $e$. Each rod $h$ is provided with a gear-wheel $j$, the teeth of the gears meshing with each other, as is best shown in Fig. 2. Upon one of the rods is a fixed hand-wheel $k$, so that by turning the said hand-wheel and its rod the gear-wheel thereon, engaging with the light gear-wheel on the opposite rod, will operate the latter in unison with the former and so adjust or move the bed and tank as may be desired.

$l$ designates a steam or hydraulic cylinder, to which water or steam may be admitted through ports $m$ or $m'$, according to the position of the cut-off $n$. The forward end of the piston-rod $o$ is provided with a piston $p$, which fits closely in the tank $b$, and is adapted to operate upon the material which may be placed therein and force the same forward through the port $q$, formed at a central point in the conical forward end $r$ of the tank. The tank is provided with a stop-cock $s$ at a point where the port $q$ is formed therein, so that said port may be opened or closed, as circumstances may require.

$t$ designates a mold-support, in the present instance shown as of circular form and provided with a shaft $u$, which is journaled at its ends in beds or supports connected with the forward end of the tank $b$, and with a bracket or upright $v$ at the opposite side, connected with the frame $a$. The mold-support $t$ is provided at suitable intervals on its periphery with beds $w$, forming sections of molds suitable for molding or shaping carbon points or pencils or other articles which it may be desired to construct. The outer portion $x$ of the molds is made removable, so that after a point has been formed or molded therein the removable section may be taken away and the molded article removed from the matrix. The forward bed or side support $y$ for the mold-support is provided with horizontally-arranged rods or pins $z$, which extend into holes $a'$, formed in the forward side of the upright $v$, so that said bed $y$ may be moved toward and from the mold-support $w$. A rod $b'$ extends through the upright $v$ and is provided at its inner end with a head $c'$, which bears against the bed $y$ opposite the end of the mold brought into position to be filled from the tank $b$. A strong spring $d'$ is interposed between the forward side of the upright $v$ and the head $c'$, so as to operate with a tendency of pressing the head $c'$ against the bed $y$ and firmly clamping the ends of the mold brought into position to be filled between the beds $y$ and $y'$. A hand-wheel $e'$ has a screw-threaded connection with the rod $b'$ outside of the upright $v$, so that by turning the said hand-wheel the rod $b'$ and head $c'$ may be drawn away from the bed $y$, permitting the mold-support $w$ to be rotated on its journal-shaft $w$ and the molds to be freely moved between the beds $y$ $y'$.

$f'$ designates a bracket connected with the upright $v$ and extending over the mold-support to a point above that which will be occupied by a mold which may be brought into position to be supplied with material from the tank.

$g'$ is a bed or clamp supported in the bracket $f'$ by means of rods $h'$, which extend through the bracket, and are provided on their upper ends with gears $i'$, having screw-threaded connection with the said rods, and which engage a pinion $j'$, connected with a shaft $k'$, extending through the bracket $f'$ at a point between the rods $h'$. The upper end of the shaft $k'$ is provided with a bevel-gear $l'$, which is engaged by a bevel-pinion $m'$ on the end of the shaft $n'$, with which is connected a hand-wheel $o'$, so that by turning the hand-wheel the bed $g'$ may be raised or lowered, as it may be desired, through the medium of the pinions and gear-wheels and their adjuncts just described.

The beds $w$ for supporting the molds are made adjustable to and from the periphery of the mold-support by means of rods $p'$, screw-threaded at both ends, and tapped at one end in the hub of the mold-support and at the other end in the bed $w$, so that by turning the rods $p'$ the mold-supports may be adjusted, as just described.

$q'$ designates an air-port formed in the bed $y$ at a point opposite the port $q$, formed in the tank $b$, a suitable cock $r'$ being provided to open and close said air-port $q'$, as circumstances may require, in the operation of molding the points.

The operation of my machine may be described as follows: Material of suitable character being supplied to the tank $b$ and a mold being brought into proper position opposite the forward end of the tank and so that the port $q$ will communicate with the matrix of the mold, the part $x$ of the mold will be clamped upon the other part or parts by means of the bed $g'$, the hand-wheel $o'$, and intermediaries, as described. The steam or water will then be admitted to the cylinder $l$ or other suitable motor set in operation to actuate the piston $p$ to press the material in the tank $b$ through the port $q$ into the matrix of the mold with the necessary pressure, the air in the material and in the mold finding an exit through the port $q'$. Before pressure upon the material in the matrix of the mold ceases the cock $r'$ may be closed. After the pencil has been molded the stop-cock $s$ may, if need be, be momentarily closed, the clamp-bed be raised from the mold, the pressure of spring $d'$ released, and the mold-support $t$ rotated so as to bring another mold into position to be acted upon, as has just been described with reference to the mold moved out of register with the port $q$. In this way carbon points or pencils may be rapidly molded or formed, one operator attending to the removal of the molded points, while another may be engaged in making or molding the same.

It is obvious that various changes may be made in the form and arrangement of parts comprising my invention without departing from the nature or spirit thereof, it being manifest that other means than those herein shown may be employed for clamping the parts of the molds together and for adjusting and supporting the mold-support, and, further, that instead of making the mold-support of a rotary nature it might be made to slide horizontally and be provided with a plurality of molds, which might be moved into position opposite the port $q$ of the tank $b$ and away therefrom, and that any suitable motor may be employed for operating the piston $p$.

Having thus explained the nature of my invention and described a way of constructing and using the same, I declare that what I claim is—

1. A machine for molding carbon points or pencils, consisting of a tank provided with an outlet-port and adapted to contain plastic material to be operated upon, a piston to force the material from the tank through the said port, a motor or engine to move the piston, and a movable mold-support adapted to support a plurality of separable molds and move the same into position to be filled through the port of the tank, the adjustable supporting-bed for one part of each of said molds, and an adjustable clamping-bed for clamping said molds together, as set forth.

2. A machine for molding carbon points or pencils, consisting of a tank provided with an outlet-port and adapted to contain the material to be operated upon, a piston to force the material from the tank through the said port, a motor or engine to move the piston, a movable mold-support adapted to support a plurality of separable molds and move the same into position to be filled through the said port of the tank, and a clamp for clamping the parts of the molds together at the point of filling, as set forth.

3. A rotary mold-holding frame or support provided with a plurality of removable molds, a support for the ends of the molds, a port in one of said supports to admit material to the molds to be molded, an air-exit port in the other support, and stop-cocks in said ports, as set forth.

4. A rotary mold-holding frame or support provided with adjustable beds $w$, adapted to support molds thereon, a clamping-bed $g'$ for clamping the parts of the mold together, a tank $b$, provided with a port $q$, and a movable piston $p$, as set forth.

In testimony whereof I have signed my name to this specification, in the presence of two subscribing witnesses, this 13th day of September, A. D. 1890.

THOMAS B. DOOLEY.

Witnesses:
ARTHUR W. CROSSLEY,
A. D. HARRISON.